United States Patent [19]

Kraft

[11] Patent Number: 4,707,071
[45] Date of Patent: Nov. 17, 1987

[54] PLUG PART FOR A RELEASABLE PLUG CONNECTION OF LIGHT WAVEGUIDES

[75] Inventor: Heinz-Peter Kraft, Munich, Fed. Rep. of Germany

[73] Assignee: Siemens Aktiengesellschaft, Berlin and Munich, Fed. Rep. of Germany

[21] Appl. No.: 772,930

[22] Filed: Sep. 5, 1985

[30] Foreign Application Priority Data

Sep. 13, 1984 [DE] Fed. Rep. of Germany ....... 3433673

[51] Int. Cl.$^4$ ............................................... G02B 7/26
[52] U.S. Cl. .................................................. 350/96.21
[58] Field of Search ............... 350/96.15, 96.20, 96.21, 350/96.3

[56] References Cited

U.S. PATENT DOCUMENTS 4,296,999 10/1981 Mead ................................. 350/96.21

FOREIGN PATENT DOCUMENTS 1953283  2/1972 Fed. Rep. of Germany .
2652712 11/1979 Fed. Rep. of Germany .
2516858  1/1983 Fed. Rep. of Germany .

*Primary Examiner*—Eugene R. LaRoche
*Assistant Examiner*—Steven J. Mottola
*Attorney, Agent, or Firm*—Hill, Van Santen, Steadman & Simpson

[57] ABSTRACT

A plug part which is used in a releasable plug connection of light waveguides comprises a cylindrical carrier tube with an optical fiber being centrally fixed therein and has a planar processed end surface extending perpendicular to an axis of the tube. The end face of the optical fiber is set back by a defined amount relative to an end surface of the carrier tube. The set back is produced either by a cross-groove or a depression in the end of the tube with the depth corresponding to the defined amount.

10 Claims, 6 Drawing Figures

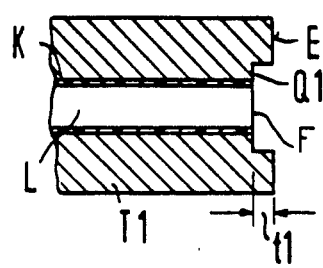
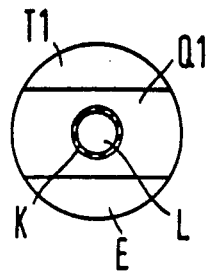
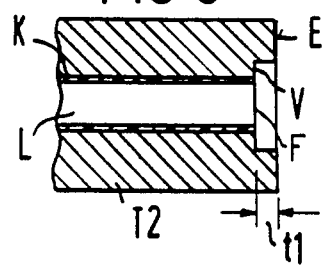
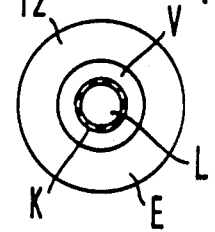
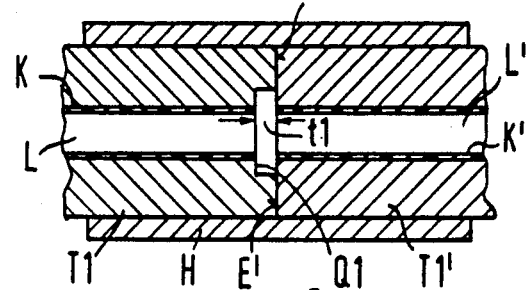
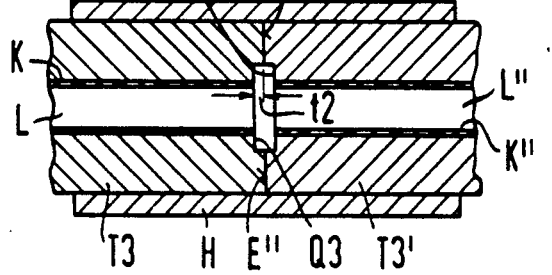

PLUG PART FOR A RELEASABLE PLUG CONNECTION OF LIGHT WAVEGUIDES

BACKGROUND OF THE INVENTION

The present invention is directed to a plug part for releasable plug connection of light waveguides wherein the plug part includes a cylindrical carrier tube in which an optical fiber is centrally fixed and the end surface of the part and the fiber are planarly processed to extend perpendicular to the axis of the carrier tube.

A plug part having a fiber disposed on an axis of a carrier tube with the end of the fiber and tube being planarly processed to lie in a plane perpendicular to the axis of the carrier tube is disclosed in German Patent No. 25 16 858. In the plug part disclosed in this patent, the optical fiber is freed of its cladding in its end region and is introduced into the bore of a cylindrical carrier tube where it is centrally fixed by gluing. Subsequently, the fiber end together with the end face of the carrier tube are ground and polished so that a planar end face arises which should be aligned as precisely as possible perpendicular to the outside diameter of the carrier tube and to the axis of the tube. For producing a plug connection two of these plug parts are introduced into a precisely fitting common sleeve and their end faces are pressed against one another either by a spring or through a screw or threaded fitting. As a result of this axial pressing, the end faces should lie flat against one another whereby a beam reflection is to be particularly prevented.

In the known plug connections, the axial plugging forces are absorbed by the optical fibers at least to a considerable degree. A dislocation of the optical fibers in the carrier tube can occur on the basis of these mechanical stresses. Particularly, given the thermal cycling, the adhesive layer surrounding the optical fiber begins to work and becomes displaced to extend beyond the end face of the plug. A disturbing reflection will occur due to an air gap which is produced between the two plug parts of the plug connection by this flow of the adhesive.

German AS No. 26 52 712 discloses a releasable plug connection for light waveguides wherein an annular distancing or spacing washer is inserted between the end faces of the carrier tubes of the two plug parts. This spacing washer is a precisely defined spacing between the end faces of the optical fibers so that no optical reflection can occur in this connected segment. The defined spacing would thus have to be adapted via the thickness of the annular spacing washer to a fraction of the wavelength $\lambda$ of the light to be conducted and this is not practically implemented with known machining processes.

In German AS No. 19 53 283, an arrangement is also disclosed in which an annular spacing or distancing washer is inserted between the end faces of the carrier tubes of both plug parts in a releasable plug connection of light waveguides. According to one alternative, however, it should also be possible to achieve a precisely defined space between the end faces of the optical fibers in that the transmitted optical energy is set to its maximum value with the assistance of a mounting and adjustment device. The mounting and adjustment device, which guarantees such a precise definition of the interferometer length, however, are not available in practice.

SUMMARY OF THE INVENTION

The object of the present invention is to specify a practically realizable solution as to how, given releasable plug connections of light waveguides, reflections at the boundary surfaces of both the in-coupling as well as the out-coupling plugs can be reduced to extremely slight amounts or can be entirely avoided.

To accomplish these goals, the present invention is directed to an improvement in a plug part for a releasable plug connection of a light waveguide, said plug part comprising a cylindrical carriage tube in which an optical fiber is centrally fixed and which plug part has a planarly processed end surface extending perpendicular to the axis of the carrier tube. The improvement is that the end face of the optical fiber is set back by a definite amount relative to the end surface of the plug part.

The invention is based on the perception that at least in one plug part of a releasable plug connection the end face of the optical fiber must be set back by a definite amount relative to the end surface and that given a proper definition of this definite amount, the wave components reflected at the two boundary surfaces of glass and air of the plug connection can be cancelled either entirely or up to a slight residual amount. In particular, such an offset between the end surfaces of the carrier tube and the end face of the optical fiber can be realized with sufficient precision with the assistance of a known mechanical processing method such as grinding, lapping or burnishing. Thus the finished plug connection will have between the end faces of the two optical fibers a definite spacing which is dependent on the wavelength of the light being coupled and on the optical fiber particularly on the band width of the radiation and the numerical aperture of the optical fiber and lies in a region of $n\cdot\lambda/2$ wherein n is a whole, natural number and $\lambda$ is the wavelength of the light to be conducted. This spacing between the end faces of the two optical fibers of a plug connection is always optimally dimensioned wherever a maximum energy passage is measured and, thus, minimum attenuation losses are present.

As a result of employing the inventively constructed plug parts, the plug attenuation is reduced on the one hand and, on the other hand, the coherent reflection wave, which greatly disturbs a semiconductor laser which may be connected to the fiber of the plug part, is avoided. The optical fibers can therefore be secured as heretofore in a carrier tube either by gluing or by shrinking the carrier tube onto the fiber. In the finished plug connection, only the polished end faces are pressed against one another, whereas the optical fibers are not stressed in the axial direction. Thus, the thermal cycling can thus not lead to an elevation of the plug attenuation.

An inventively fashioned plug part can be utilized for releasable plug connections with a second plug part wherein the end face of the optical fiber lies in the plane of the end face of the plug part. In this case, the end face of the optical fiber in the first plug part is then set back relative to the end surface by a definite amount in the region of $n\cdot\lambda/2$ wherein n is a whole, natural number and $\lambda$ is a wavelength of the light to be conducted.

An inventively fashioned plug part, however, can also be utilized for a releasable plug connection with a second, identically fashioned plug part. In this case, the end face of the optical fiber in both plug parts is then set back relative to the end face by a definite amount in the region of $n\cdot\lambda/4$, whereby n is a whole, natural number and $\lambda$ is the wavelength of the light to be conducted.

The numbers n of either plug part need not be the same but the sum must be an even number.

In accordance with the particular preferred embodiments of the invention, a cross-groove aligned perpendicular to the axis of the carrier tube is introduced into the end surface. The cross-groove has a width which is greater than the outside diameter of the optical fiber and has a depth which defines the offset of the end face of the optical fiber relative to the end surface of the tube. The inventive offset between the end face of the optical fiber and the end surface can thus be produced in a particularly simple way by forming the cross-groove into the end surface.

The offset between the end face of the optical fiber and the end surface can also be produced in that an axial, cylindrical depression aligned parallel to the axis of the carrier tube is introduced into the end surface. The diameter of the depression is greater than the outside diameter of the optical fiber and the depth of the depression defines the offset of the end face of the optical fiber relative to the end surface of the tube.

BRIEF DESCRIPTION OF THE DRAWINGS

FIG. 1 is a longitudinal cross-sectional view through a plug part for a releasable plug connection in accordance with the present invention;

FIG. 2 is an end view of the plug part of FIG. 1;

FIG. 3 is a longitudinal cross-sectional view of an embodiment of the releasable plug part in accordance with the present invention;

FIG. 4 is an end view of the plug part of FIG. 3;

FIG. 5 is a longitudinal cross-sectional view through a releasable plug connection of a light waveguide utilizing the improved plug part of the present invention; and FIG. 6 is a longitudinal cross-sectional view of an embodiment of a releasable plug connection utilizing two of the improved plug parts of the present invention.

DESCRIPTION OF THE PREFERRED EMBODIMENTS

The principles of the present invention are particularly useful in a plug part which is illustrated in FIGS. 1 and 2. In the plug part of FIG. 2, a cylindrical carrier tube T1 has an axial bore which receives an optical fiber L that is stripped of its cladding, centrally adjusted relative to the outside diameter of the carrier tube T1, and fixed in the bore by an adhesive layer K. After a front end surface E of the plug part has been ground flat and polished perpendicular to the axis of the carrier tube T1, a cross-groove Q1 is applied over the end face E to extend perpendicular to the axis of the plug part. The width of the cross-groove Q1 is greater than the outside diameter of the optical fiber L. The cross-groove Q1 has a depth t1 which lies in the range of about $n \cdot \lambda/2$, wherein n is a whole, natural number and $\lambda$ is the wavelength of the light to be conducted.

A second embodiment of the plug part is illustrated in FIGS. 3 and 4 wherein the end of the optical fiber L stripped of its cladding is centrally fixed in a cylindrical carrier tube T2 with the assistance of an adhesive layer K. Unlike the embodiment in FIGS. 1 and 2, an axial cylindrical depression V aligned parallel to the axis of the carrier tube T2 has been introduced into the polished end surface E. The diameter of this depression V is greater than the outside diameter of the optical fiber L. The depth t1 of the depression V as in the first embodiment is $n \cdot \lambda/2$. Thus, in both embodiments, the fiber L has an end face F, which is spaced from the end face E of the tubes T1 or T2, respectively, by a depth t1 and the end face F extends in a plane parallel to the plane of the end face E.

A releasable plug connection for light waveguides is illustrated in FIG. 5, utilizing plug parts such as shown in FIGS. 1 and 2. A second plug part of this connection comprises a carrier tube T1' in which the end of the optical fiber L' stripped of its cladding is centrally fixed with the assistance of the adhesive K'. This second plug part is provided with an end surface E' which was produced by having the end face of the optical fiber L' and the carrier tube T1' ground flat and polished in common. When in the finished plug connection, the end surfaces E and E" of the plug parts are introduced into a common sleeve H and are pressed against one another by known means such as a spring or a threaded fitting, the spacing between the end faces of the optical fibers L and L' corresponds to the depth t1 of a cross-groove Q1. Since the depth t1 lies in the region of $n \cdot \lambda/2$, the wave components reflected at the two boundary surfaces of glass and air in the cross-groove Q1 are entirely cancelled out or are substantially cancelled out.

Another releasable plug connection for light waveguides is illustrated in FIG. 6 wherein two identical design plug parts are used in a common sleeve H. The optical fibers L and L" are coupled to one another by each being centrally fixed in the allocated carrier tube T3 or T3' with the assistance of an adhesive layer K or, respectively, K" Cross-grooves Q3 or, respectivley, Q3', which each have a depth t2 of $n \cdot \lambda/4$, are applied in the polished end surfaces E and E" of the two plug parts T3 and T3'. When the end surfaces E and E" are pressed against one another, the end faces of the optical fibers L and L" have a space in the order of $n \cdot \lambda/2$. Thus, the wave components reflected at the two boundary surfaces of glass and air in the cross-grooves Q3 and Q3' are also cancelled here with an entire cancellation or with a substantial cancellation.

Although various minor modifications may be suggested by those versed in the art, it should be understood that I wish to embody within the scope of the patent granted hereon, all such modifications as reasonably and properly come within the scope of my contribution to the art.

I claim:

1. In a plug part for a releasable plug connection of light waveguides, said plug part comprising a cylindrical carrier tube with an optical fiber being centrally fixed therein, said carrier tube having a planar processed end surface extending perpendicular to an axis of the tube, the improvement comprising an end face of the optical fiber being set back by a defined amount relative to the planar processed end surface of the carrier tube, said end face of the optical fiber being a base of a cross-groove, which extends perpendicular to the axis of the carrier tube and is introduced into the end surface thereof, said cross-groove having a width greater than the outside diameter of the optical fiber and a depth having an amount of approximately $n \cdot \lambda/2$ wherein n is a whole natural number and $\lambda$ is the wavelength of light to be conducted by the optical fiber.

2. In a plug part for a releasable plug connection of light waveguides, said plug part comprising a cylindrical carrier tube with an optical fiber being centrally fixed therein, said carrier tube having a planar processed end surface extending perpendicular to an axis of the tube, the improvement comprising an end face of the optical fiber being set back by a defined amount relative to the planar processed end surface of the carrier tube, said end face of the optical fiber being a base of a cross-groove, which extends perpendicular to the axis of the carrier tube and is introduced into the end surface thereof, said cross-groove having a width greater than the outside diameter of the optical fiber and having a depth of approximately $n\cdot\lambda/4$, wherein n is a whole natural number and $\lambda$ is the wavelength of the light to be conducted by the optical fiber of the plug part.

3. In a plug part for a releasable plug connection of light waveguides, said plug part comprising a cylindrical carrier tube with an optical fiber being centrally fixed therein, said carrier tube having a planar processed end surface extending perpendicular to an axis of the tube, the improvement comprising an end face of the optical fiber being set back by a defined amount relative to the planar processed end surface of the carrier tube, said end face of the optical fiber being a base of an axially central depression extending perpendicular to the axis of the carrier tube, said depression being in the planar processed end surface of the tube and having a diameter greater than the outside diameter of the optical fiber, and a depth of approximately $n\cdot\lambda/2$, wherein n is a whole natural number and $\lambda$ is the wavelength of the light to be conducted.

4. In a plug part for a releasable plug connection of light waveguides, said plug part comprising a cylindrical carrier tube with an optical fiber being centrally fixed therein, said carrier tube having a planar processed end surface extending perpendicular to an axis of the tube, the improvement comprising the end face of the optical fiber being set back by a defined amount relative to the planar processed end surface of the carrier tube, said end face of the optical fiber being a base of an axially central depression extending perpendicular to the axis of the carrier tube, said depression being in the planar processed end surface of the tube and having a diameter greater than the outside diameter of the optical fibers and a depth of approximately $n\cdot\lambda/4$, wherein n is a whole natural number and $\lambda$ is the wavelength of the light to be conducted in the optical fiber.

5. In a releasable plug connection having means for receiving two plug parts with each of the plug parts having end faces in contact with each other, each of said plug parts being formed by a cylindrical carrier tube having an optical fiber centrally disposed and fixed therein, each of said plug parts having an end surface finished to extend perpendicularly to an axis of the carrier tube of the part, the improvements comprising the optical fibers of the two plug parts having an end face extending parallel to the end surface of its plug part with the end face of the fiber of only one of the two parts being set back by a definite amount relative to the end surface and the end face of the optical fiber of the other of the two parts lying in a plane of the end surface of the other part, said definite amount being approximately $n\cdot\lambda/2$, wherein n is a whole, natural number and $\lambda$ is the wavelength of the light to be conducted in the optical fibers, so that when the two plug parts are inserted in the connection and have the end surfaces of the parts in contact, the end faces of the optical fibers are spaced apart by the definite amount.

6. In a releasable plug connection having means for receiving two plug parts with each of the plug parts having end faces in contact with each other, each of said plug parts being formed by a cylindrical carrier tube having an optical fiber centrally disposed and fixed therein, each of said plug parts having an end surface finished to extend perpendicularly to an axis of the carrier tube of the part, the improvements comprising each of the optical fibers to both of the two plug parts having an end face extending parallel to the end surface of its plug part and set back relative to the end surface by an amount of approximately $n\cdot\lambda/4$, wherein n is a whole, natural number and $\lambda$ is the wavelength of the light to be conducted, so that when the two plug parts are inserted in the connection and have the end surfaces of the parts in contact, the end faces of the optical fibers are spaced apart by a definite amount.

7. In a plug connection according to claim 5, wherein the end face of the optical fiber of the one plug part is formed by a base of a cross-groove extending perpendicular to the axis of the carrier tube and extending inwardly from the end surface of the carrier tube, said cross-groove having a width greater than the diameter of the optical fiber.

8. In a plug connection according to claim 5, wherein the end face of the optical fiber of the one plug part is formed by a base of an axial cylindrical depression extending inwardly from the end surface of the carrier tube with the base being aligned perpendicular to the axis of the carrier tube, said depression having a diameter greater than the outside diameter of the optical fiber.

9. In a plug connection according to claim 6, wherein at least one of the two optical fibers has the end face of the fiber being a base of a cross-groove extending inwardly from the end surface of the carrier tube, said cross-groove having a width greater than the outside diameter of the optical fiber.

10. In a plug connection according to claim 6, wherein at least one of the two plug parts has the end face of the optical fiber being a base of an axial cylindrical depression extending inwardly from the end surface of the carrier tube, said base being perpendicular to the axis of the carrier tube.

* * * * *